(12) United States Patent
Hilberer

(10) Patent No.: US 9,650,029 B2
(45) Date of Patent: May 16, 2017

(54) COMPRESSED AIR SUPPLY SYSTEM AND METHOD FOR OPERATING A COMPRESSED AIR SUPPLY SYSTEM

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1408 days.

(21) Appl. No.: 12/525,630

(22) PCT Filed: Feb. 7, 2008

(86) PCT No.: PCT/EP2008/000936
§ 371 (c)(1),
(2), (4) Date: Jun. 14, 2010

(87) PCT Pub. No.: WO2008/095702
PCT Pub. Date: Aug. 14, 2008

(65) Prior Publication Data
US 2011/0139263 A1    Jun. 16, 2011

(30) Foreign Application Priority Data

Feb. 7, 2007   (DE) .................. 10 2007 005 988
Jan. 17, 2008   (DE) .................. 10 2008 004 807

(51) Int. Cl.
*B60T 8/34*   (2006.01)
*B60T 17/00*   (2006.01)
*B60T 17/02*   (2006.01)

(52) U.S. Cl.
CPC ............ *B60T 17/004* (2013.01); *B60T 17/02* (2013.01); *Y10T 137/0396* (2015.04); *Y10T 137/85978* (2015.04)

(58) Field of Classification Search
CPC ........ B60T 13/683; B60T 8/327; B60T 13/26; B60T 17/04; B60T 15/027; B60T 17/004
(Continued)

(56) References Cited

U.S. PATENT DOCUMENTS 5,111,840 A  *  5/1992  Miller et al. ............... 137/270
5,114,315 A     5/1992  Kaltenthaler et al.
(Continued)

FOREIGN PATENT DOCUMENTS

DE   10 2004 059 834 A1   6/2006
DE      102005057004    *  4/2007   ............ B60T 17/002
(Continued)

OTHER PUBLICATIONS

International Search Report dated Jul. 22,2009 with English translation (four (4) pages).
(Continued)

*Primary Examiner* — Robert A Siconolfi
*Assistant Examiner* — Mahbubur Rashid
(74) *Attorney, Agent, or Firm* — Crowell & Moring LLP

(57) ABSTRACT

A compressed air supply system for a utility vehicle includes an air dryer unit provided with a filter unit, an electrically controllable valve unit and a pneumatically controllable discharge valve unit, a compressor with a coupling, which supplies compressed air to the air dryer unit via a delivery pipe, a multi-circuit safety valve unit which removes the compressed air from the air dryer unit, and an electrically controllable compressor coupling switch valve unit. An electronic control unit controls or regulates the functions of the air dryer unit and the compressor coupling switch valve unit.

24 Claims, 8 Drawing Sheets

(58) Field of Classification Search
USPC ......... 303/3, 15; 137/14, 98, 109, 110, 111, 137/114, 115.07, 115.13, 115.19, 115.23, 137/118.06, 239, 309, 487.5
See application file for complete search history.

(56) References Cited

U.S. PATENT DOCUMENTS

| | | | | |
|---|---|---|---|---|
| 6,089,831 | A * | 7/2000 | Bruehmann | B60G 17/0523 303/3 |
| 6,098,967 | A * | 8/2000 | Folchert | B60G 17/052 267/64.11 |
| 6,540,308 | B1 * | 4/2003 | Hilberer | 303/6.01 |
| 7,080,891 | B1 * | 7/2006 | Hilberer | 303/6.01 |
| 8,220,876 | B2 * | 7/2012 | Detlefs | B60T 17/02 303/119.1 |
| 8,297,297 | B2 * | 10/2012 | Schnittger | B60T 17/02 137/115.04 |
| 8,348,634 | B2 * | 1/2013 | Ertl | B60T 17/002 137/239 |
| 8,382,448 | B2 * | 2/2013 | Fries | B60T 17/02 251/129.05 |
| 8,740,316 | B2 * | 6/2014 | Schal | B60T 17/02 137/115.18 |
| 2004/0195910 | A1 | 10/2004 | Aumuller et al. | |
| 2006/0006733 | A1 * | 1/2006 | Geiger | B60G 17/0157 303/3 |
| 2006/0244305 | A1 * | 11/2006 | Hilberer | 303/15 |
| 2008/0007111 | A1 * | 1/2008 | Detlefs et al. | 303/3 |
| 2008/0206070 | A1 | 8/2008 | Kley et al. | |
| 2009/0133395 | A1 * | 5/2009 | Hilberer | 60/329 |
| 2010/0074764 | A1 * | 3/2010 | Schnittger | B60T 17/004 417/53 |
| 2011/0052419 | A1 * | 3/2011 | Bordacs | B01D 53/0454 417/53 |

FOREIGN PATENT DOCUMENTS

| | | | | |
|---|---|---|---|---|
| DE | 102007013672 | * | 9/2008 | B60T 17/02 |
| DE | 102007013673 | * | 9/2008 | B60T 17/004 |
| EP | 0 808 756 A1 | | 11/1997 | |
| EP | 0 808 756 B1 | | 11/1997 | |
| EP | 1 464 557 A1 | | 10/2004 | |
| EP | 1 508 488 A1 | | 2/2005 | |
| EP | 1884430 A2 | * | 2/2008 | B60T 13/26 |
| WO | WO 02/24506 A1 | | 3/2002 | |

OTHER PUBLICATIONS

German Office Action dated May 7, 2009 with English translation (six (6) pages).
Mexican Office Action dated Nov. 21, 2014 (three (3) pages).

* cited by examiner

COMPRESSED AIR SUPPLY SYSTEM AND METHOD FOR OPERATING A COMPRESSED AIR SUPPLY SYSTEM

This application is a national stage of PCT International Application No. PCT/EP2008/00936, filed Feb. 7, 2008, which claims priority to German Patent Application Nos. 10 2007 005 988.6, filed Feb. 7, 2007 and 10 2008 004 807.0, filed Jan. 17, 2008, the entire disclosures of which are herein expressly incorporated by reference.

BACKGROUND AND SUMMARY OF THE INVENTION

The invention relates to a compressed air supply system for a utility vehicle, having an air dryer unit with a filter unit, with an electrically activatable valve unit and with a pneumatically activatable blow-off valve unit, a compressor which supplies compressed air to the air dryer unit via a feed line, a multi-circuit protective valve unit which draws compressed air from the air dryer unit, and an electrically activatable compressor coupling switching valve unit.

The invention also relates to a method for operating a compressed air supply system for a utility vehicle.

Utility vehicles having pneumatic components require a compressed air supply system. The compressed air is generally fed by a compressor into an air treatment system where the air which is introduced is cleaned in a filter unit before then finally being supplied via a multi-circuit protective valve for use, for example by the brake system of the utility vehicle.

After certain feed quantities are reached or after certain periods of time have elapsed, it is necessary to clean the filter unit. For this purpose, valves are connected within the air treatment system in such a way that compressed air from storage tanks, either the storage tanks of the service brake circuit or one or more storage tanks provided especially for the purpose, flows in the reverse direction through the filter unit, before then being allowed to flow, laden with moisture and foreign particles, out of the filter unit and into the atmosphere. During said regeneration phases, the compressor is generally shut off or placed into an idle phase.

A disadvantage of said regeneration phases is the compressed air consumption. In particular, the compressed air which is present in the feed line between the compressor and the filter unit is lost unnecessarily during the regeneration if suitable countermeasures are not implemented. To prevent the loss of said compressed air, it has already been proposed to shut off the feed line between the compressor and the filter unit during the regeneration phases. Such a shut-off is also referred to as "turbo cut-off" since the compressor often extracts compressed air from the turbo system of the utility vehicle, such that the shut-off of said feed line keeps an air loss in the turbocharger low. It is in particular also possible for the overrun operation of the utility vehicle to be utilized for the recovery of compressed air, while the compressor is simultaneously feeding air. This results in an energy saving.

In conventional systems, provision is now made for a regeneration of the filter unit to be carried out in every idle phase of the compressor. In practice, however, this frequently leads to an over-regeneration of the filter unit and therefore to an excessive loss of compressed air, such that the positive effect of the compressor deactivation is ultimately overcompensated for in a negative way as a result of the loss of compressed air. Furthermore, the benefit of the overrun phases of the motor vehicle is not always without its problems, since it is also the case here that shift processes, in particular those which involve the switching of the compressor, lead to air losses which sometimes again nullify the energy saving obtained by the utilization of the overrun phases.

Compressed air supply systems can be divided into different classes with regard to their degree of integration. Here, purely pneumatic systems and electropneumatic systems which are fitted with their own control and regulating electronics represent the boundaries of the spectrum of integration. In the present connection, the focus is on systems referred to as semi-dryers, that is to say systems which have an air dryer and electrically and pneumatically activatable valves within a unit but which are activated by an external electronic control unit. Although this partially opposes the basic demand for an ever greater degree of integration, this does however offer advantages with regard to the arrangement of the compressed air supply system in the utility vehicle, since the components can be arranged in a distributed fashion taking into consideration the available installation space. The basic considerations regarding energy saving during the generation of compressed air apply here to the same extent as to fully integrated systems.

The object on which the invention is based is that of coordinating the deactivation of the compressor and the regeneration of the compressed air supply system in the most economic way possible.

The invention builds on the generic compressed air supply system in that an electronic control unit is provided which controls and/or regulates functions of the air dryer unit and of the compressor coupling switching valve unit. The electronic control unit may consequently control all the functions associated with the supply of compressed air and in particular with the saving of compressed air. This relates firstly to the core functions of the air dryer unit, specifically the air treatment, the possibility of regeneration and a pressure regulating function. The feed phases and non-feed phases of the compressed air supply system may be made dependent on numerous parameters, the values of all of which are available to the electronic control unit. It is consequently possible to provide optimized operating processes.

It is expediently provided that the electronic control unit is suitable for placing the compressed air supply system into an energy saving operating state in which the compressor coupling switching valve unit separates the compressor coupling. To obtain an energy saving, therefore, the compressor is no longer driven.

It may then be provided in particular that the electronic control unit is suitable for placing the compressed air supply system into a regeneration operating state in which the compressor coupling switching valve unit separates the compressor coupling, the electrically activatable valve unit is activated and the pneumatically activatable blow-off valve unit opens a blow-off line. The energy saving may thus be maintained even during the regeneration phase of the compressed air supply system.

The invention is expediently refined in that a further electrically activatable valve unit is provided, and in that a feed line shut-off valve unit is provided which can be pneumatically activated by the further electrically activatable valve unit. With regard to the saving of energy, it is possible for a feed line shut-off valve to be pneumatically actuated indirectly by means of the electrically activatable valve units in the air dryer unit, with said actuation being adapted to the presence of a feed phase and/or a non-feed phase of a compressor which is coupled to an internal combustion engine by means of a coupling.

It may also be provided that the feed line shut-off valve unit closes the feed line in the energy saving operating state. The closure of the feed line serves to prevent the compressed air which is situated in the feed line from being lost.

It is likewise expedient for the feed line shut-off valve unit to close the feed line in the regeneration operating state. The saving of the compressed air which is situated in the feed line may thus be maintained even during the regeneration phase of the compressed air supply system.

It may also be provided that the electronic control unit is suitable for placing the compressed air supply system into a feed air renewal operating state in which the compressor coupling is closed, the feed line shut-off valve unit opens the feed line and the pneumatically activatable blow-off valve unit opens a blow-off line. Such a process is expedient for preventing freezing of the feed line.

It is therefore particularly advantageous that the feed air renewal operating state can be assumed in particular when a temperature sensor which is connected to the electronic controller provides a value which is characteristic of the external temperature which lies below a threshold value.

It may also be provided that the blow-off valve unit can be pneumatically activated by the electrically activatable valve unit. In this way, the feed line shut-off valve unit can be activated in a targeted fashion without influencing the system in any other way, while the blow-off valve unit is opened whenever the second electrically activatable valve unit is supplied with current. Since the second electrically activatable valve unit is supplied with current in particular in order to carry out a regeneration of the air dryer unit, and since it is necessary here to open the blow-off valve in any case, this is a simple variant in terms of circuitry. It should however be taken into consideration that, if the compressed air in the feed line is to be renewed, it is likewise necessary to open the blow-off valve. At least a brief regeneration of the filter unit will then occur even if this is possibly not required. It is evident that both activation variants of the blow-off valve unit, that is to say either by means of the first electrically activatable valve or by means of the second electrically activatable valve, have advantages and disadvantages, wherein one or the other variant will be preferable depending on the physical application.

It may also be provided that the blow-off valve unit can be pneumatically activated by the further electrically activatable valve unit. The blow-off valve unit is therefore activated by the same electrically activatable valve as the feed line shut-off valve unit. Consequently, the feed line shut-off valve unit is always closed when the blow-off valve unit is opened. This ensures that a loss of the feed line volume is prevented in any case, but makes an increase in system pressure necessary if the feed line volume is to be exchanged for the purpose of preventing freezing.

It may expediently be provided that the blow-off valve unit has a control piston which, during the ventilation of a control chamber, opens a blow-off valve, with a 2/2-way valve function additionally being provided for blocking and opening up a regeneration air path. If the switching of the blow-off valve by the circuit logic is always coupled to the execution of a regeneration, such an integrated design of a valve with a plurality of functions is expedient, wherein all the functions may be realized by aerating a single control chamber.

The invention builds on the generic method in that the functions of the air dryer unit and of the compressor coupling switching valve unit are controlled and/or regulated by means of an electronic control unit. In this way, the advantages and peculiarities of the compressed air supply system according to the invention are also realized within the context of a method. This also applies to the particularly preferred embodiments of the method according to the invention as specified below.

The method is expediently refined in that the electronic control unit places the compressed air supply system into an energy saving operating state in which the compressor coupling switching valve unit separates the compressor coupling.

It may be provided in particular that the electronic control unit places the compressed air supply system into a regeneration operating state in which the compressor coupling switching valve unit separates the compressor coupling, the second electrically activatable valve unit is activated and the pneumatically activatable blow-off valve unit opens a blow-off line.

The method according to the invention may be realized in a particularly expedient fashion in that a further electrically activatable valve unit is provided, and in that a feed line shut-off valve unit is provided which can be pneumatically activated by the further electrically activatable valve unit. It may then be provided that the feed line shut-off valve unit closes the feed line in the energy saving operating state. It is also possible for the feed line shut-off valve unit to close the feed line in the regeneration operating state.

The method according to the invention is in particular then expediently refined in that the electronic control unit places the compressed air supply system into a feed air renewal operating state in which the compressor coupling is closed, the feed line shut-off valve unit opens the feed line and the pneumatically activatable blow-off valve unit opens a blow-off line.

In this connection, it is advantageous for the feed air renewal operating state to be assumed in particular when a temperature sensor which is connected to the electronic controller provides a value which is characteristic of the external temperature which lies below a threshold value.

According to one variant of the method according to the invention, it may be provided that the blow-off valve unit is pneumatically activated by the electrically activatable valve unit.

According to another variant, it is also possible for the blow-off valve unit to be pneumatically activated by the further electrically activatable valve unit.

It is also provided that the electronic controller controls the transitions between the feed state and the energy saving operating state on the basis of a predefined activation pressure threshold and a predefined deactivation pressure threshold, with the deactivation pressure threshold corresponding to a greater pressure than the activation pressure threshold. The presence of a feed phase or a non-feed phase of compressed air is thus made dependent on the present system pressure.

It is in particular provided that the electronic control unit places the compressed air supply system into a feed state if a pressure measured at the compressed-air consumer side falls below an activation pressure threshold.

It is also expedient for the electronic control unit to place the compressed air supply system into the energy saving operating state if a pressure measured at the compressed-air consumer side exceeds a deactivation pressure threshold.

It is particularly advantageous for the electronic control unit to place the compressed air supply system into a feed state if the utility vehicle is in an overrun operating phase and if a pressure measured at the compressed-air consumer side lies between an activation pressure threshold and a deactivation pressure threshold. It is thus possible for the compressed air supply device according to the invention to be placed into a feed state even when the activation pressure threshold has not yet been reached, specifically when the vehicle is in an overrun phase. In this way, the energy which is converted into heat energy, and therefore made useless, mostly as a result of braking operations during the overrun phase is converted into an increased compressed air reserve. It is particularly expedient for the additional feed of compressed air above the activation pressure threshold to be carried out when an imminent increased compressed air demand is expected.

It is particularly preferable for the deactivation pressure threshold to be increased if the utility vehicle is in an overrun operating phase. The increase of the deactivation pressure threshold may be expedient both when the compressor has switched into the feed phase on account of the activation pressure threshold being undershot, and when the feed phase has been commenced without the activation threshold being undershot.

The invention will now be explained by way of example below with reference to the appended drawings on the basis of particularly preferred embodiments. In the drawings:

DETAILED DESCRIPTION OF THE DRAWINGS

Figure 1:
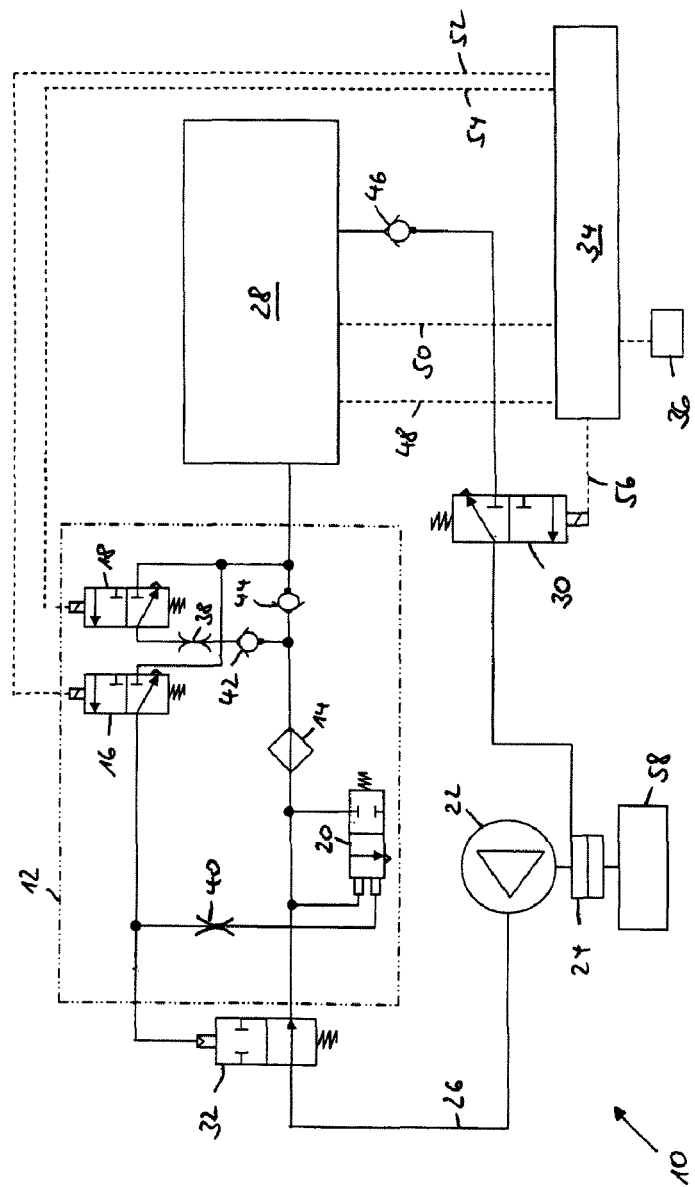
FIG. 1 shows a schematic illustration of a first embodiment of a compressed air supply system according to the invention.

In the following description of the drawings, the same reference numerals are used to denote identical or similar components.

FIG. 1 shows a schematic illustration of a first embodiment of a compressed air supply system according to the invention. The compressed air supply system 10 comprises, as essential components, an air dryer unit 12, a multi-circuit protective valve unit 28, a compressor 22 with a coupling 24, a compressor coupling switching valve unit 30, and a feed line shut-off valve unit 32 which is arranged in a feed line 26 between the compressor 22 and the air dryer unit 12.

The air dryer unit 12 comprises pneumatically and electrically activatable components, but the electronic control unit 34, which serves inter alia to activate the electrically activatable components which are provided in the air dryer unit 12, is arranged externally. As an air dryer unit 12, which may range systematically from a purely pneumatic air dryer unit to a fully integrated electronic air treatment system (EAC), an air dryer unit of said type is also referred to as a semi-dryer. The air dryer unit 12 comprises a first electrically activatable valve unit 16 which is embodied as a 3/2-way valve, a second electrically activatable valve unit 18 which is likewise embodied as a 3/2-way valve, and a pneumatically activatable blow-off valve unit 20, which is designed as a 2/2-way valve. Within the context of the present disclosure, the second electrically activatable valve unit 18 is also referred to merely as "electrically activatable valve unit" or "electrically activatable valve", while the first electrically activatable valve unit is also denoted by the terms "further valve unit" or "further valve". A filter unit 14 is also provided within the air dryer unit 12. Further components include two throttles 38, 40 and two non-return valves 42, 44.

The air dryer unit 12 is connected at the outlet side to a multi-circuit protective valve unit 28 in which are provided, in particular, overflow valves in order to protect the different compressed-air consumer circuits from one another and ensure a predefined filling sequence. The multi-circuit protective valve unit 28 has a plurality of compressed-air outlets, with the illustration showing only that compressed-air outlet which leads via a non-return valve 46 to a compressor coupling switching valve unit 30 which is designed as a 3/2-way valve. The compressor coupling switching valve unit 30 is then in turn connected to the compressor coupling 24 such that the compressor coupling 24 may be coupled or separated depending on the switching state of the compressor coupling switching valve unit 30.

The electronic control unit 34 receives various input signals, for example from pressure sensors which are installed in the multi-circuit protective valve unit 28. Corresponding signal lines 48, 50 are illustrated by way of example. The electronic control unit 34 also receives temperature information from a temperature sensor 36. The first electrically activatable valve unit 16, the second electrically activatable valve unit 18 and the compressor coupling switching valve unit 30 are activated by means of signal lines 52, 54, 56 which are connected to output signal ports of the control unit 34.

The valve positions shown in FIG. 1 are those which are assumed during a normal feed phase of the compressed air supply system. In said feed phase, the compressor coupling 24 couples the compressor 22 to the internal combustion engine 58 of the utility vehicle, such that compressed air is fed via the feed line 26 and the feed line shut-off valve unit 32 into the air dryer unit 12. The compressed air flows onward through the filter unit 14 and through the non-return valve 44 before then being conducted to the multi-circuit protective valve unit 28, from where the compressed air can be provided to the individual consumer circuits. If it is now established by means of a pressure measurement, communicated for example by the signal lines 48, 50, that a deactivation pressure threshold has been reached, then the control unit 34 triggers a switch of the compressor coupling switching valve unit 30.

In this way, a control inlet of the compressor coupling 24 is connected by means of the non-return valve 46 to a compressed-air outlet of the multi-circuit protective valve 28, such that the compressor coupling 24 is separated. The compressed air supply system is therefore placed into an energy-saving operating state. Furthermore, by switching the first electrically activatable valve unit 16 within the air dryer unit 12, it is possible to trigger an opening of the blow-off valve unit 20. At the same time, however, as a result of the switching of the first electrically activatable valve unit 16, the feed line shut-off valve unit 32 is also switched, such that the feed line 26 is separated from the air dryer unit 12. The pressure in the feed line 26 is consequently maintained despite the blow-off valve 20 being open.

Proceeding from this state, a regeneration of the filter unit 14 can take place if required specifically by virtue of the second electrically activatable valve unit 18 of the air dryer unit 12 being switched. A switch of said valve unit 18 causes the non-return valve 44 to be bypassed via the non-return valve 42, such that compressed air can flow out of the consumer circuits via the multi-circuit protective valve 28, the second electrically activatable valve unit 18, the non-return valve 42, the filter unit 14 and the blow-off valve 20. A further operating state may be assumed as a function of the temperature determined by the temperature sensor 36. To prevent the moist compressed air which is present in the feed line 26 from causing the feed line and/or the feed line shut-off valve unit 32 to freeze, said compressed air must be renewed from time to time at low temperatures. This is achieved by virtue of the compressor 22 being placed into its feed phase, and the feed line shut-off valve unit 32 being placed into its throughflow position, despite a lack of demand for compressed air. Since, in this state, the blow-off valve 20 is positively closed because it is activated in parallel with the feed line shut-off valve unit 32, the compressor 22 feeds air and causes an increase in the system pressure. Consequently, no compressed air is lost during said brief renewal of the feed line volume. However, it should be mentioned in connection with the embodiment in FIG. 1 that, upon the commencement of the non-feed phase, on account of the associated switching of the blow-off valve unit 20, the air volume between the feed line shut-off valve unit 32 and the non-return valve 44 is depressurized in any case; in particular, therefore, the pressure which is stored in the filter unit 14 is lost.

Figure 2:
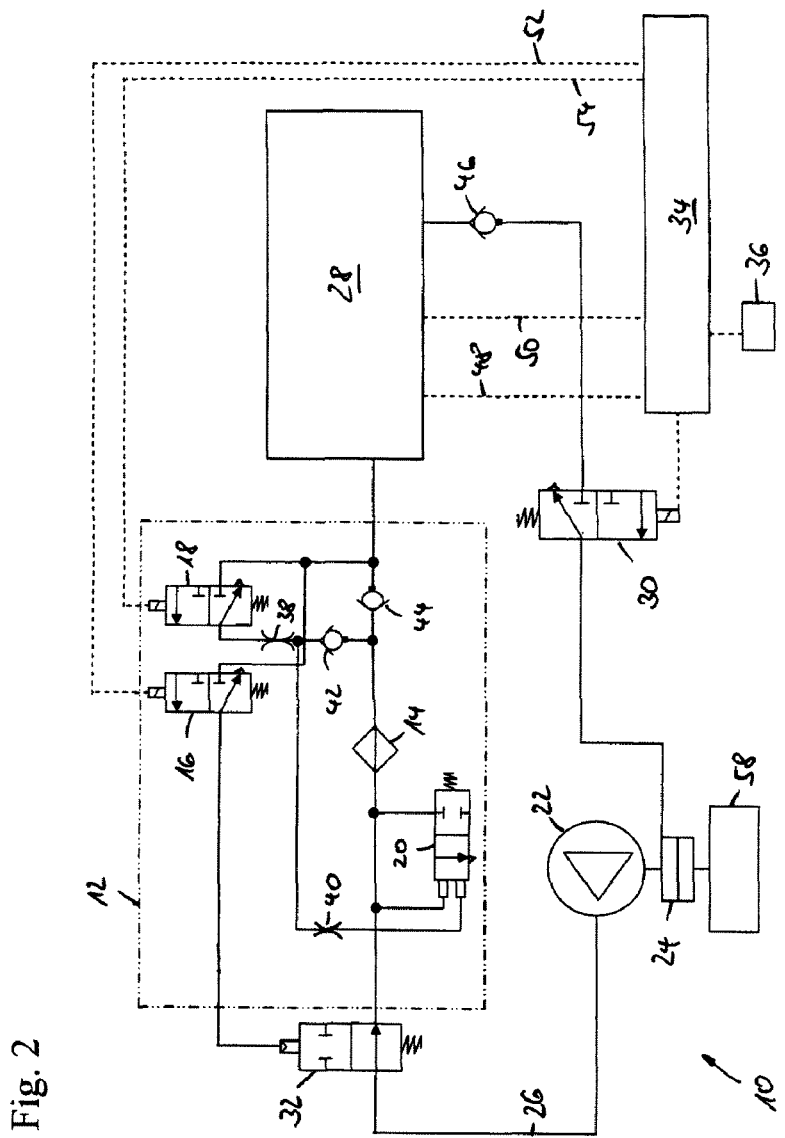
FIG. 2 shows a schematic illustration of a second embodiment of a compressed air supply system according to the invention.

FIG. 2 shows a schematic illustration of a second embodiment of a compressed air supply system according to the invention. The compressed air supply system 10 illustrated here corresponds, in many details, to the system described in connection with FIG. 1. Only the pneumatic activation of the blow-off valve unit with regard to the electrically activatable valve units 16, 18 differs. Specifically, in FIG. 2, the blow-off valve unit 20 is switched by means of the second electrically activatable valve unit 18, that is to say always in connection with a regeneration of the filter unit 14. This has the advantage over the system according to FIG. 1 that, in the non-feed phase, not only the compressed-air volume in the feed line 26 is maintained but rather also the compressed-air volume stored between the feed line shut-off valve unit 32 and the non-return valve 44. Only when a regeneration is initiated by means of a switch of the second electrically activatable valve unit 18 is the blow-off valve 20 opened, and the pressure loss which is desired in this case takes place. If the volume in the feed line 26 must be renewed on account of low temperatures, then the feed line shut-off valve unit 32 must be moved into its open position, the compressor 22 must be set in operation and it is necessary to switch the blow-off valve 20 by switching the second electrically activatable valve unit 18. A brief regeneration therefore inevitably occurs even if possibly not required. A brief regeneration of said type may however be acceptable since, as a result of the decoupling of the switching processes of the feed line shut-off valve unit 32 and of the blow-off valve unit 20, it is possible to obtain a considerable saving of compressed air during the non-feed phase.

In the embodiment in FIG. 2, the feed line shut-off valve unit 32 fulfills its purpose in particular during the regeneration phases of the compressed air supply system 10. Specifically, the blow-off valve 20 is opened then, which, without a feed line shut-off valve unit 32, would lead to a pressure loss in the feed line 26. It is thus conceivable to move the feed line shut-off valve unit 32 into its state in which it blocks the feed line 26 only when a regeneration is impending or initiated, because outside the regeneration phases, the pressure path between the compressor 22 and the non-return valve 44 is closed off. Accordingly, it is even possible to dispense with the first electrically activatable valve unit 16 entirely and to also control the feed line shut-off valve unit 32 by means of the second electrically activatable valve unit 18. In this case, the transition from the feed phase into the non-feed phase would be brought about exclusively by virtue of the compressor coupling switching valve unit 30 being switched so as to deactivate the compressor 22. The feed line shut-off valve unit 32 would in particular remain open. Only when a regeneration is to take place is the second electrically activatable valve unit 18 switched, which would result in the feed line 26 being shut off by the feed line shut-off valve unit 32 and in the blow-off valve 20 being opened.

In FIG. 2, the control pressure connection to the blow-off valve 20 connects between the throttle and the non-return valve 42. It is likewise possible for said connection to be arranged between the throttle 38 and the valve unit 18.

Figure 3:
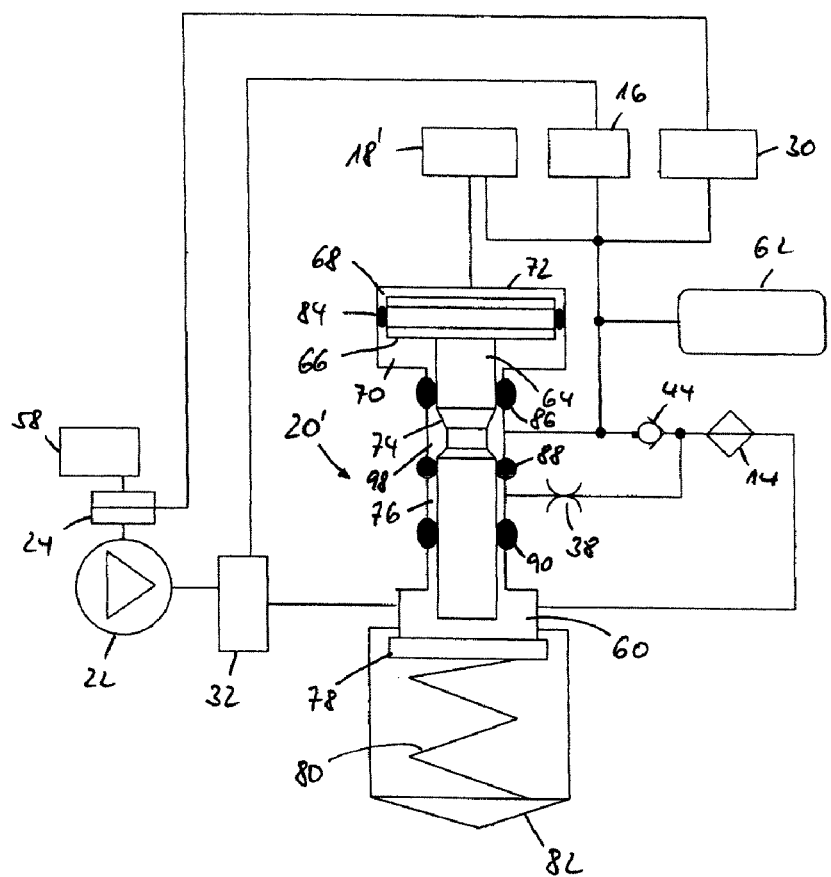
FIG. 3 shows a schematic axial section through a valve unit which may advantageously be used in connection with the present invention, and also a first ensemble of components connected thereto.

FIG. 3 shows a schematic axial section through a valve unit which may advantageously be used in connection with the present invention, and also a first ensemble of components connected thereto. With the blow-off valve 20' illustrated here, it is possible for the blow-off function and the provision of a regeneration air path to be combined in a special way. With regard to the circuit logic, the circuit illustrated in FIG. 3 corresponds to that in FIG. 2, that is to say the blow-off function and the regeneration function are positively coupled to one another, while the switching of the feed line shut-off valve unit 32 may take place completely independently of these.

In the switching state which is illustrated, compressed air can be fed by the compressor 22 via the feed line shut-off valve unit 32. The compressed air which is fed in this way flows through a valve chamber 60 of the blow-off valve unit 20' and from there via the filter unit 14 and via the non-return valve 44 to the consumers which are symbolized here by a compressed-air tank 62, wherein it is self-evidently possible for a multi-circuit protective valve device to also be interposed. The system pressure which is present downstream of the non-return valve 44 may then be utilized by the compressor coupling switching valve unit 30, the first electrically activatable valve unit 16 and the second electrically activatable valve unit 18' to provide control pressures for the compressor coupling 24, the feed line shut-off valve unit 32 and the blow-off valve unit 20'.

The blow-off valve unit 20' comprises a control piston. An end-mounted control piston plate 66 separates a control chamber 68, which is connected to the second electrically activatable valve unit 18', from a rear chamber 70 by means of a seal 84 which interacts with a valve housing 72. The rear chamber 70 comprises a ventilation opening (not illustrated) in order to enable an unhindered movement of the control piston 64. The control piston 64 also has a constriction 74, with the control piston being sealed off, at both sides of the constriction 74 by means of seals 86, 88, with respect to the adjacent chambers which surround the control piston 64. The valve chamber which surrounds the constriction 74 is therefore sealed off with respect to the rear chamber 70 of the control piston plate 66 and with respect to a further intermediate valve chamber 76. Said intermediate valve chamber 76 is separated from the above-mentioned valve chamber 60 by means of a further seal 90. The valve chamber 60 is delimited by a valve plate 78 which is pressed against a valve seat by a spring 80. In this way, the valve plate 78 seals off the valve chamber 60 with respect to an outlet 82. The blow-off valve 20' therefore comprises a total of five seals, specifically the valve seat which interacts with the valve plate 78 and the seals 84, 86, 88, 90 which are embodied as O-rings and which interact with the valve housing 72 and seal off the control chamber 68, rear chamber 70, the chamber surrounding the constriction 74, intermediate valve chamber 76 and valve chamber 60 with respect to one another.

In the switching state illustrated in FIG. 3, the second electrically activatable valve unit 18' ventilates the control chamber 68. The valve plate 78 seals off the valve chamber 60 with respect to the outlet 82, and the seal 88 seals off the region downstream of the non-return valve 44, that is to say the compressed-air consumer side, with respect to the air path, which is provided with a throttle 38, to the filter unit 14. If the second electrically activatable valve unit 18 is now activated such that the control chamber 68 is aerated, said second electrically activatable valve unit 18 moves the control piston 64. This has the result that firstly the control piston lifts the valve plate 78 up from the valve seat, such that the valve chamber 60 is connected to the outlet 82, and secondly the chamber surrounding the constriction 74 now provides a connection between the consumer side, that is to say in the region downstream of the non-return valve 44, and the filter unit 14. Since the outlet is open in this state, it is possible for compressed air to flow back from the consumer side to the outlet via the filter unit. The blow-off valve 20' thus combines the blow-off function with a 2/2-way valve function for providing a regeneration air path. In the present exemplary embodiment, said 2/2-way valve function is realized by means of a constriction. It is likewise possible to provide bores which connect different chambers around the control piston 64 to one another, or seal off said chambers from one another, as a function of the position of the control piston 64.

Figure 4:
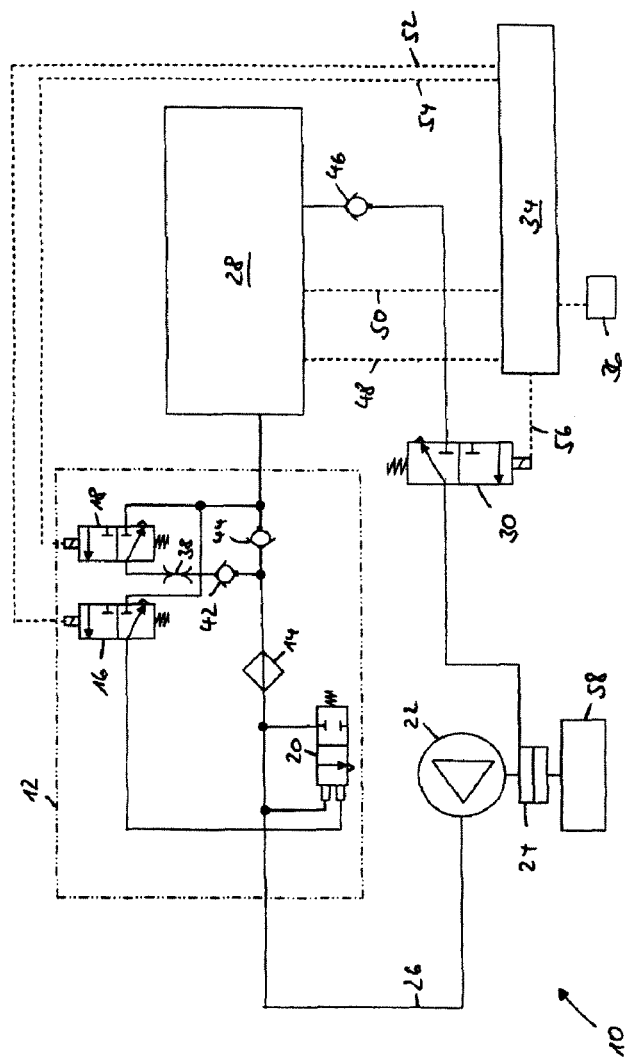
FIG. 4 shows a schematic illustration of a variant of the first embodiment of a compressed air supply system according to the invention.

FIG. 4 shows a schematic illustration of a variant of the first embodiment of a compressed air supply system according to the invention. In contrast to the embodiment according to FIG. 1, no feed line shut-off valve unit 32 is provided here. Accordingly, the throttle, which is denoted in FIG. 1 by the reference numeral 40, in the control line of the blow-off valve 20 is also dispensed with here. The first electrically activatable valve unit 16 therefore serves exclusively for activating the blow-off valve 20.

Figure 5:
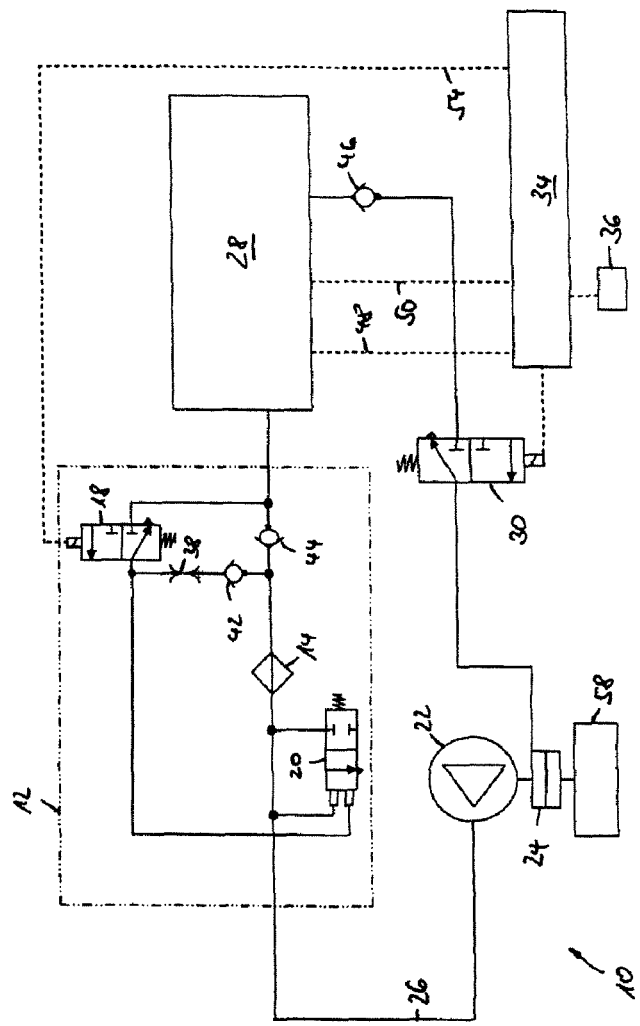
FIG. 5 shows a schematic illustration of a variant of the second embodiment of a compressed air supply system according to the invention.

FIG. 5 shows a schematic illustration of a variant of the second embodiment of a compressed air supply system according to the invention. In contrast to the embodiment according to FIG. 2, no feed line shut-off valve unit is provided. Accordingly, the electrically activatable valve unit which is denoted in FIG. 2 by the reference numeral 16 can be dispensed with entirely, since in the embodiment of FIG. 2, said valve unit serves only to activate the feed line shut-off valve unit 32. The air dryer unit 12 therefore makes do with a single electrically activatable valve device 18.

Figure 6:
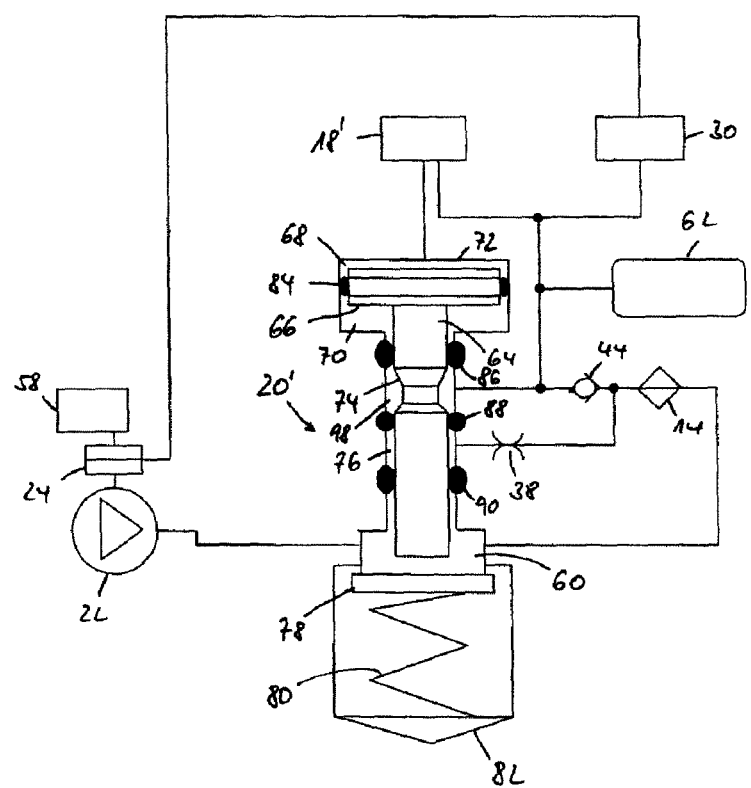
FIG. 6 shows a schematic axial section through a valve unit which may advantageously be used in connection with the present invention, and also a second ensemble of components connected thereto.

FIG. 6 shows a schematic axial section through a valve unit which may advantageously be used in connection with the present invention, and also a first ensemble of components connected thereto. In comparison with the circuitry according to FIG. 3, the electrically activatable first valve unit which is denoted in said FIG. 3 by the reference numeral 16, and the feed line shut-off valve unit which is denoted in FIG. 3 by the reference numeral 32, are omitted in the circuitry of the blow-off valve 20' illustrated here.

Figure 7:
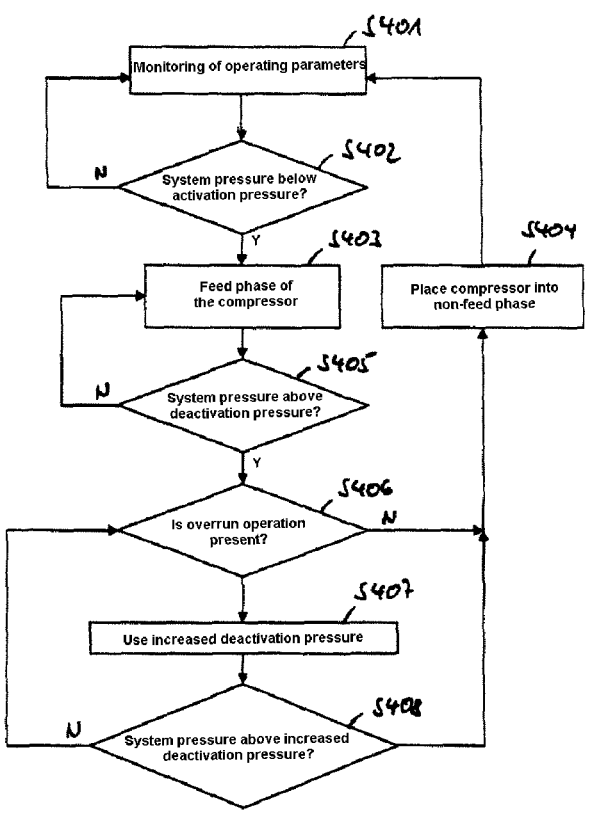
FIG. 7 shows a flow diagram for explaining a first method for operating a compressed air supply device according to the invention.

FIG. 7 shows a flow diagram for explaining a first method for operating a compressed air supply device according to the invention. In step S401, operating parameters of the utility vehicle are monitored, inter alia the system pressure of the compressed air supply system and the presence of an overrun phase. In step S402, it is determined whether the system pressure lies below a predefined activation pressure threshold. If this is not the case, then the monitoring of the operating parameters is continued in step S401. In contrast, if the system pressure lies below the activation pressure threshold, then in step S403, the compressor is activated so as to feed air. In step S405, it is then determined whether the system pressure lies above a deactivation pressure threshold at which the feed state is normally ended. If the system pressure still lies below the deactivation pressure threshold, then the feed phase of the compressor is continued, as per step S403. If the deactivation pressure threshold has been exceeded, then a deactivation does not take place immediately, but rather it is checked in step S406 whether the utility vehicle is in an overrun phase. Only when it is detected that an overrun operating phase is not present is the compressor placed into a non-feed phase in step S404, whereupon the monitoring of operating parameters is resumed as per step S401. However, if an overrun operating phase is present, then in step S407, the deactivation pressure threshold is set to a higher value, such that the feed phase of the compressor can last longer. In step S408, it is then checked whether the system pressure lies above the increased deactivation pressure threshold. If this is not the case, then the above-described check as to whether overrun operation is present is resumed as per step S406. Only when it is determined, in step S408, that the system pressure now lies above the increased deactivation pressure is the compressor placed into its non-feed phase as per step S404, and the monitoring of operating parameters is resumed in step S401.

Figure 8:
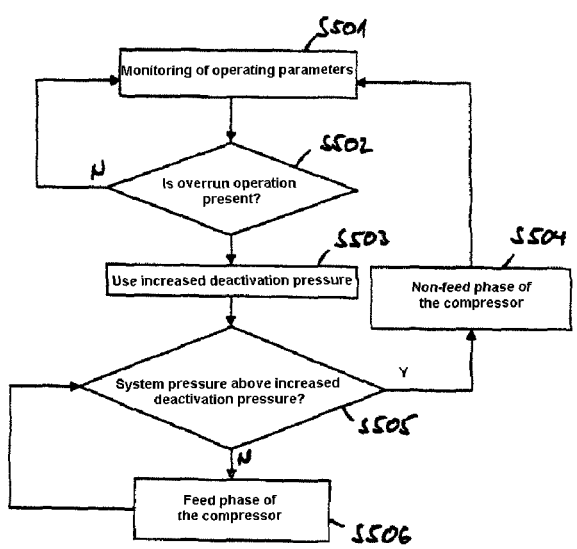
FIG. 8 shows a flow diagram for explaining a second method for operating a compressed air supply device according to the invention.

FIG. 8 shows a flow diagram for explaining a second method for operating a compressed air supply device according to the invention. While it is the case in the method described in connection with FIG. 7 that the overrun operation is only utilized in an improved way if a feed phase of the compressor is present in any case, it is possible in the yet further improved method as per FIG. 8 for the feed phase to be initiated at any time on the basis of a present overrun operation, as long as pressure requirements, which must be checked, are present at that time. In detail: in step S501, the method again commences from monitoring of the operating parameters. In step S502, it is then checked, independently of the present pressure conditions, as to whether overrun operation is present. If this is not the case, then the operating parameters continue to be monitored as per step S501. However, if overrun operation is present, then in the subsequent step S503, the deactivation pressure threshold is increased. It is then checked in step S505 as to whether the system pressure lies above the increased deactivation pressure. If this is the case, then the non-feed phase of the compressor is maintained as per step S504. However, if the system pressure lies below the increased deactivation pressure threshold, then in step S506, the feed phase of the compressor is initiated, with said feed phase being maintained by means of the cyclical run-through of steps S505 and S506 until the system pressure lies above the increased deactivation pressure. The non-feed phase of the compressor is then initiated as per step S504, and the monitoring of the operating parameters as per step S501 is resumed. The method illustrated in FIG. 8 may be used only in parallel with other monitoring methods. Specifically, it is additionally necessary in any case to monitor the pressure states in the vehicle and, if appropriate, to initiate a feed phase of the compressor on the basis of said pressure states.

The features of the invention disclosed in the above description, in the drawings and in the claims may be essential to the realization of the invention both individually or in any desired combination.

| Table of Reference Symbols: | |
|---|---|
| 10 | Compressed air supply system |
| 12 | Air dryer unit |
| 14 | Filter unit |
| 16 | Valve unit |
| 18 | Valve unit |
| 20 | Blow-off valve unit |
| 20' | Blow-off valve unit |
| 22 | Compressor |
| 24 | Coupling |
| 26 | Feed line |
| 28 | Multi-circuit protective valve unit |
| 30 | Compressor coupling switching valve unit |
| 32 | Feed line shut-off valve unit |
| 34 | Control unit |
| 36 | Temperature sensor |
| 38 | Throttle |
| 40 | Throttle |
| 42 | Non-return valve |
| 44 | Non-return valve |
| 46 | Non-return valve |
| 48 | Signal line |
| 50 | Signal line |
| 52 | Signal line |
| 54 | Signal line |
| 56 | Signal unit |
| 58 | Internal combustion engine |
| 60 | Valve chamber |
| 62 | Compressed-air tank |
| 64 | Control piston |
| 66 | Control piston plate |
| 68 | Control chamber |
| 70 | Rear chamber |
| 72 | Valve housing |
| 74 | Constriction |
| 76 | Intermediate valve chamber |
| 78 | Valve plate |
| 80 | Spring |
| 82 | Outlet |
| 84 | Seal |
| 86 | Seal |
| 88 | Seal |
| 90 | Seal |
| 94 | Control piston |

The invention claimed is:

1. A compressed air supply system for a utility vehicle, comprising:
    an air dryer unit comprising a filter unit having a compressed air supply flow direction;
    an electrically activatable valve unit configured to supply a regeneration air flow through the electrically activatable valve unit to the filter unit in a direction opposite the compressed air supply flow direction;
    a compressor having a coupling, said compressor supplying compressed air to the air dryer unit via a feed line;
    a multi-circuit protective valve unit operatively configured to draw compressed air from the air dryer unit;
    an electrically activatable compressor coupling switching valve unit;
    a blow-off line branching off from the feed line upstream of the filter unit and connecting the feed line to a pneumatically activatable blow-off valve unit for discharging compressed air from the feed line;
    an electronic control unit operatively configured to control functions of the air dryer unit and the electrically activatable compressor coupling switching valve unit;
    a shut-off valve unit arranged in the feed line downstream of the compressor and upstream of the blow-off line, wherein the shut-off valve unit is operable to shut off compressed air flow from the compressor through the feed line while maintaining pressure in a portion of the feed line between the compressor and the shut-off valve unit; and
    a further electrically activatable valve unit arranged to control flow of compressed air for pneumatically activating the feed line shut-off valve unit.

2. The compressed air supply system according to claim 1, wherein the electronic control unit is operatively configured to place the compressed air supply system into an energy saving operating state in which the compressor coupling switching valve unit separates the compressor coupling from the compressor.

3. The compressed air supply system according to claim 2, wherein the electronic control unit is operatively configured to place the compressed air supply system into a regeneration operating state in which the compressor coupling switching valve unit separates the compressor coupling from the compressor, the electrically activatable valve unit is activated, and the pneumatically activatable blow-off valve unit opens the blow-off line.

4. The compressed air supply system according to claim 1, wherein the feed line shut-off valve unit closes the feed line in an energy saving operating state.

5. The compressed air supply system according to claim 1, wherein the feed line shut-off valve unit closes the feed line in a regeneration operating state.

6. The compressed air supply system according to claim 1, wherein the electronic control unit is operatively configured to place the compressed air supply system into a feed air renewal operating state in which the compressor coupling is closed, the feed line shut-off valve unit opens the feed line, and the pneumatically activatable blow-off valve unit opens a blow-off line.

7. The compressed air supply system according to claim 6, further comprising a temperature sensor operatively coupled to the electronic control unit, wherein said feed air renewal operating state is recognized when a value indicative of an external temperature lies below a threshold value.

8. The compressed air supply system according to claim 1, wherein the blow-off valve unit is pneumatically activatable by way of the electrically activatable valve unit.

9. The compressed air supply system according to claim 1, wherein the blow-off valve unit is pneumatically activatable by way of the further electrically activatable valve unit.

10. The compressed air supply system according to claim 1, wherein the pneumatically activatable blow-off valve unit comprises a control piston which, during ventilation of a control chamber, opens a blow-off valve, and a 2/2-way valve function being additionally provided for blocking and opening up a regeneration air path.

11. A method for operating a compressed air supply system for a utility vehicle, the compressed air supply system comprising an air dryer unit including a filter unit having a compressed air supply flow direction, an electrically activatable valve unit configured to supply a regeneration air flow through the electrically activatable valve unit to the filter unit in a direction opposite the compressed air supply flow direction, a compressor having a coupling, said compressor supplying compressed air to the air dryer unit via a feed line, a blow-off line branching off from the feed line upstream of the filter unit and connecting the feed line to a pneumatically activatable blow-off valve unit for discharging compressed air from the feed line, a multi-circuit protective valve unit drawing compressed air from the air dryer unit, an electrically activatable compressor coupling switching valve unit, a shut-off valve unit arranged in the feed line downstream of the compressor and upstream of the blow-off line, and a further electrically activatable valve unit arranged to control flow of compressed air to the shut-off valve unit, wherein the method comprises the acts of:

controlling a function of the air dryer unit by way of the electronic control unit;

at least one of controlling and regulating a function of the compressor coupling switching valve unit by way of the electronic control unit; and pneumatically activating the feed line shut-off valve unit by way of the further electrically activatable valve unit to shut off compressed air flow from the compressor through the feed line while maintaining pressure in a portion of the feed line between the compressor and the shut-off valve unit.

12. The method according to claim 11, further comprising the act of placing the compressed air supply system into an energy saving operating state via the electronic control unit, in which energy saving operating state the compressor coupling switching valve unit separates the compressor coupling.

13. The method according to 12, further comprising the act of placing the compressed air supply system into a regeneration operating state by way of the electronic control unit, in which regeneration operating state the compressor coupling switching valve unit separates the compressor coupling, the electrically activatable valve unit is activated to permit regeneration air to flow through the filter unit to the blow-off line, and the pneumatically activatable blow-off valve unit opens a blow-off line.

14. The method according to claim 13, wherein the feed line shut-off valve unit closes the feed line in the energy saving operating state.

15. The method according to claim 14, wherein the feed line shut-off valve unit closes the feed line in the regeneration operating state.

16. The method according to claim 15, further comprising the acts of: placing the compressed air supply system into a feed air renewal operating state by way of the electronic control unit, in which feed air renewal operating state the compressor coupling is closed, the feed line shut-off valve unit opens the feed line, and the pneumatically activatable blow-off valve unit opens a blow-off line.

17. The method according to claim 16, wherein the feed air renewal operating state is recognized when a temperature sensor, coupled to the electronic control unit, provides a value indicative of an external temperature lying below a threshold value.

18. The method as according to claim 11, further comprising the act of pneumatically activating the blow-off valve unit by way of the electrically activatable valve unit.

19. The method according to claim 13, further comprising the act of pneumatically activating the blow-off valve unit by way of the further electrically activatable valve unit.

20. The method as claimed according to claim 11, further comprising the acts of: controlling transitions, via the electronic control unit, between a feed state and an energy saving operating state as a function of a predefined activation pressure threshold and a predefined deactivation pressure threshold, said deactivation pressure threshold corresponding to a greater pressure than said activation pressure threshold.

21. The method according to claim 20, further comprising the act of placing the compressed air supply system into a feed state via the electronic control unit if a pressure measured at a compressed-air consumer side falls below said activation pressure threshold.

22. The method according to claim 21, further comprising the act of placing the compressed air system into the energy saving operating state via the electronic control unit if a pressure measured at the compressed-air consumer side exceeds said deactivation pressure threshold.

23. The method according to claim 20, further comprising the act of placing the compressed air supply system into a feed state via the electronic control unit if the utility vehicle is in an overrun operating phase and if a pressure measured at a compressed-air consumer side lies between said activation pressure threshold and said deactivation pressure threshold.

24. The method according to claim 23, wherein said deactivation pressure threshold is increased if the utility vehicle is in the overrun operating phase.

* * * * *